United States Patent
Naganuma

(10) Patent No.: US 8,424,564 B2
(45) Date of Patent: Apr. 23, 2013

(54) DISTRIBUTOR

(75) Inventor: Tatsuo Naganuma, Tokyo-To (JP)

(73) Assignee: Kirin Beverage Company, Limited, Tokyo (JP)

( * ) Notice: Subject to any disclaimer, the term of this patent is extended or adjusted under 35 U.S.C. 154(b) by 611 days.

(21) Appl. No.: 12/307,260

(22) PCT Filed: Dec. 21, 2006

(86) PCT No.: PCT/JP2006/325522
§ 371 (c)(1),
(2), (4) Date: Mar. 12, 2009

(87) PCT Pub. No.: WO2008/007452
PCT Pub. Date: Jan. 17, 2008

(65) Prior Publication Data
US 2009/0235996 A1    Sep. 24, 2009

(30) Foreign Application Priority Data
Jul. 10, 2006  (JP) .................. 2006-189205

(51) Int. Cl.
*F16L 41/00* (2006.01)
(52) U.S. Cl.
USPC ........................ 137/561 A; 137/574
(58) Field of Classification Search .......... 137/561 A, 137/574, 561 R; 239/556, 557, 559
See application file for complete search history.

(56) References Cited

U.S. PATENT DOCUMENTS

| | | | |
|---|---|---|---|
| 3,945,882 A | * | 3/1976 | Egelhof et al. ............... 162/340 |
| 4,016,033 A | * | 4/1977 | Schiel et al. .................. 162/343 |
| 7,168,448 B2 | * | 1/2007 | Schmidt .................. 137/561 A |
| 7,255,123 B2 | * | 8/2007 | Cedergaard et al. ......... 137/262 |

FOREIGN PATENT DOCUMENTS

| | | |
|---|---|---|
| JP | 61-193894 U | 2/1986 |
| JP | 62-17186 U | 2/1987 |
| JP | 4-42287 U | 9/1992 |
| JP | 04-316785 | 11/1992 |
| JP | 08-042522 | 2/1996 |
| JP | 10-043695 A | 2/1998 |
| JP | 2000-235004 A | 8/2000 |
| JP | 2001-147012 | 5/2001 |
| JP | 2004-156960 A | 6/2004 |
| WO | WO 2005058009 A1 * | 6/2005 |

* cited by examiner

*Primary Examiner* — John K Fristoe, Jr.
*Assistant Examiner* — Time Aigbe
(74) *Attorney, Agent, or Firm* — Sughrue Mion, PLLC

(57) ABSTRACT

A distributor 6 includes a distributor body 40 and outlet pathways 42 each formed above the distributor body 40 and along a flow direction of a fluid in the distributor body 40. The distributor body 40 has a liquid pan 40a formed on the lower side, and an outlet 40b on the upper side, and the outlet 40b is internally divided to spaces by a partition plate 45, each of the spaces 45a being associated with the corresponding outlet pathway 42.

15 Claims, 1 Drawing Sheet

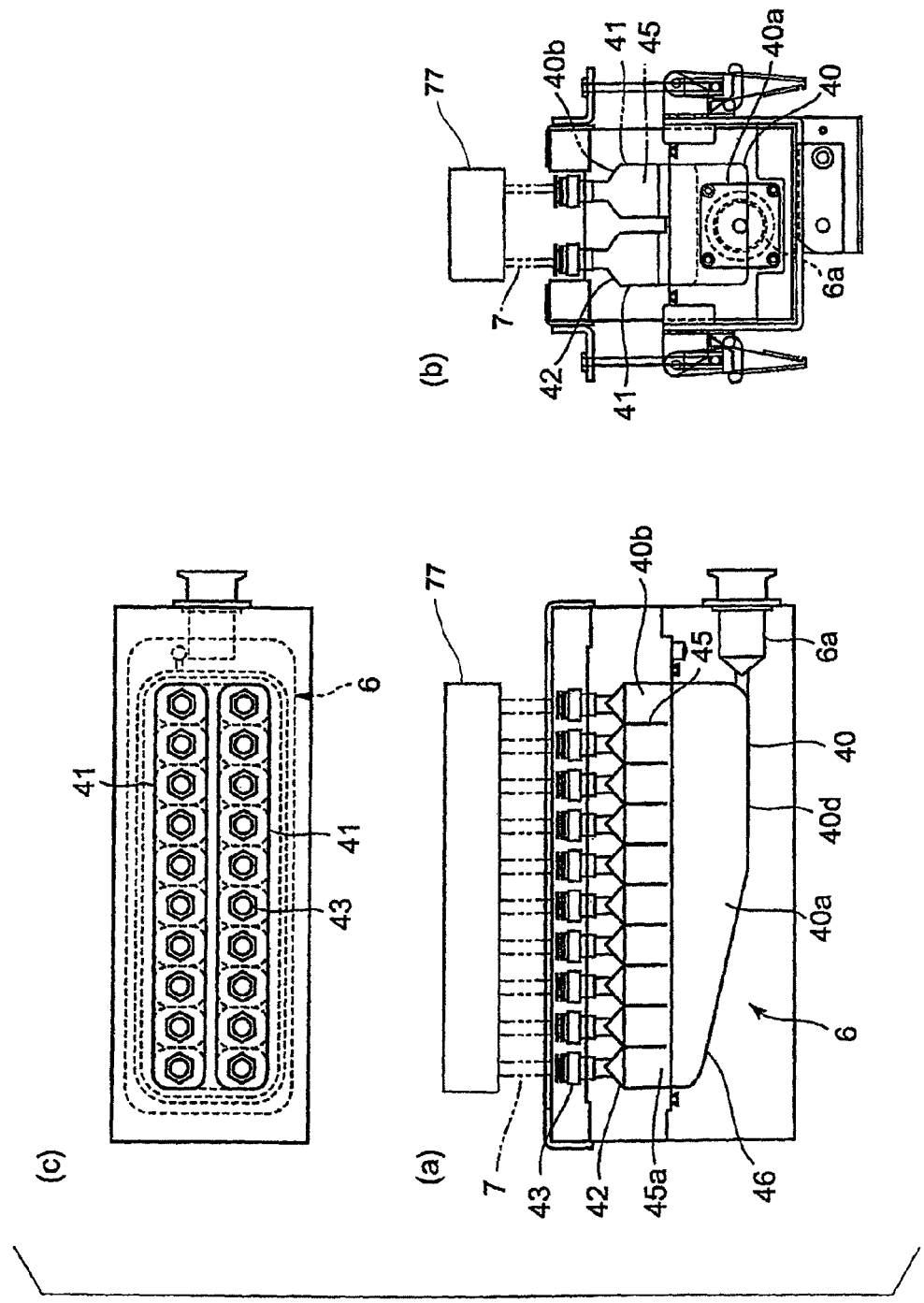

DISTRIBUTOR

CROSS-REFERENCE TO RELATED APPLICATIONS

This application is the national stage of PCT International Application No. PCT/JP2006/325522, filed on Dec. 21, 2006, which claims priority to Japanese Patent Application No. 2006-189205 filed with the Japanese Patent Office on Jul. 10, 2006, both of which are hereby incorporated by reference in their entireties. The application was published in Japanese as publication number WO 2008/007452 A1 on Jan. 17, 2007.

TECHNICAL FIELD

The present invention relates to a distributor used for a foreign substance detection and removal device for detecting and removing any foreign substances included in a liquid fluid, such as a raw fruit material, drink, or pharmaceutical which primarily contains fibrous constituents.

BACKGROUND ART

When a filter is used to remove the foreign substances included in such a fibrous fruit material or fluid as the above, the filter will be unusable if clogged with the fibrous constituents.

For this reason, Patent Document 1 proposes a device for removing any foreign substances included in a fluid, the device being constructed so that the fluid to be inspected is gravitationally guided into a plurality of narrow flow pathways first, then the foreign substances in the fluid are detected during the flow of the fluid through the narrow flow paths by a detector, and during the detection of the foreign substances, valves in each of the flow pathways with the detected foreign substances are opened in accordance with a detection signal to discharge the foreign substances. The device in Patent Document 1 uses a distributor to distribute the fluid to the plurality of narrow flow pathways within a flat plate after passing the fluid through a flow controller.

Also, Patent Document 2 proposes a foreign substance inspection system that detects and removes any foreign substances included in a fluid which contains fibrous constituents. The system in Patent Document 2 has light-transmissive inspection sight glass in a pipeline through which the fluid flows, and is constructed so that the foreign substances that have been detected using a light source and/or an imager are eliminated together with the fluid by a valve device provided in the pipeline.

In addition, Patent Document 3 proposes a foreign substance removal device that introduces a fluid into a distributor and after distributing the fluid to a large number of flow pathways, discharges the distributed fluid from each flow pathway.

Patent Document 1: JP-A-10-43695
Patent Document 2: JP-A-2000-235004
Patent Document 3: JP-A-2004-156960

DISCLOSURE OF THE INVENTION

Problems to be Solved by the Invention

The device described in Patent Document 1, however, has the problem that the device cannot reliably remove the foreign substances since the section of a sectoral flat nozzle shape, formed to guide the fluid into the narrow flow pathways, easily causes a difference in velocity between the central flow pathways and the flow pathways at both sides.

In the technique described in Patent Document 2, the system construction in which the fluid including the detected foreign substances is eliminated in the lump without the flow of the fluid being split into narrower streams midway in the pipeline is inapplicable to fluids heavily laden with foreign substances, since a significant fluid loss results from an increase in the removal rate of the foreign substances per unit area.

For the device described in Patent Documents 3 and 4, although the fluid is introduced from a pipeline into a plurality of flow pathways and then distributed, the distribution of the fluid may be nonuniform since the occurrence of a pressure imbalance or nonuniform flow of the fluid in the distributing flow pathways tends to zero the internal partial pressure of the distributing flow pathways and generate a pathway in which there is no fluid flow.

To eliminate the foreign substances reliably and minimize the amount of fluid which will be eliminated together with the foreign substances, it is necessary to split each flow pathway into narrower ones and to keep constant the flow rates and velocities of the fluid flowing through each pathway.

It is also important to minimize any impacts upon flow distribution performance, even when the fluid changes in overall flow rate, in density, or in viscosity.

The present invention has been made in view of the above. An object of the invention is to provide a distributor which, regardless of an overall flow rate, density, or viscosity of a fluid, can distribute the fluid at a uniform flow rate and velocity, thus remove foreign substances reliably from the fluid flowing through flow pathways, and minimize a loss of the fluid which would otherwise be eliminated together with the foreign substances.

Means for Solving the Problems

In one aspect of the present invention, a distributor comprises a distributor body communicated at one end thereof with a inlet pathway of a fluid, and closed at the other end thereof, and outlet pathways each provided above the distributor body, each being formed along a flow direction of the fluid in the distributor body.

In another aspect of the present invention, the distributor body comprises a liquid pan formed on the lower side, and an outlet formed on the upper side, the outlet of the distributor body being divided to spaces, each of the spaces being associated with the corresponding outlet pathway.

In yet another aspect of the present invention, the outlet of the distributor body is divided by a lattice-shaped partition plate to spaces, each of the spaces being associated with the corresponding outlet pathway.

In a further aspect of the present invention, the outlet of the distributor body includes a plurality of compartments each extending upward from a liquid pan, the compartments being formed independently of one another.

In a further aspect of the present invention, each outlet pathway includes a tapered outlet pathway tapering towards an upward end thereof.

In a further aspect of the present invention, the liquid pan of the distributor body includes a base plate gradually elevated in the flow direction of a fluid.

According to the present invention, the fluid equally divided from the outlet pathway above the distributor body is guided into a separate flow pathways of a foreign substance removal device present on a downstream side. In this case, the fluid can be guided into the separate flow pathway at a uniform flow rate and velocity by flow straightening/smoothing (rectifying) inside the distributor body.

Effects of the Invention

As described above, according to the present invention, the fluid equally divided from the outlet pathway above the distributor body is guided into the separate flow pathway of the foreign substance removal device present on the downstream side. At the same time, the fluid can be guided into the separate flow pathway at a uniform flow rate and velocity by rectifying the fluid inside the distributor body.

In addition, according to the present invention, the fluid can be guided into separate flow pathways at a uniform flow rate and velocity, regardless of the flow rate, density, or viscosity of the fluid to be processed.

Furthermore, according to the present invention, the quantity of fluid which will be eliminated together with foreign substances can be minimized.

Moreover, regardless of a method for detecting and removing foreign substances, the present invention is applicable to devices having separate flow pathways, and can improve removal performance of the foreign substance removal device used.

BRIEF DESCRIPTION OF THE DRAWINGS

FIG. 1 shows a distributor of the present invention, in side view as (a), in front view as (b), and in plan view as (c).

BEST MODE FOR CARRYING OUT THE INVENTION

The present invention will be described hereunder with reference to an embodiment shown in the accompanying drawings.

A distributor is described per FIGS. 1(*a*), 1(*b*), and 1(*c*). FIG. 1(*a*) is a side view of the distributor, FIG. 1(*b*) a front view thereof, and FIG. 1(*c*) a plan view thereof.

As shown in FIGS. 1(*a*), 1(*b*), 1(*c*), the distributor includes a distributor body 40 and an inlet pathway 6*a* for a fluid, the inlet pathway 6*a* being connected to the distributor body 40.

The distributor body 40 includes a liquid pan 40*a* formed on the lower side, and outlet 40*b* formed on the upper side. The outlet 40*b* is divided to spaces, each of the spaces being associated with a separate flow pathway of a foreign substance removal device 77. That is to say, the outlet 40*b* of the distributor body 40 includes two arrays of compartments 41 formed independently of one another. Each compartment 41 extends in a flow direction of the fluid in the distributor body 40 and contains a plurality of partition plates 45 each arranged orthogonally with respect to the flow direction of the fluid in the distributor body 40. The partition plates 45 can divide the outlet 40*b* to spaces, each of the spaces 45*c* being associated with the separate flow pathway of the foreign substance removal device.

The outlet 40*b* is connected to the separate flow pathways of the foreign substance removal device via couplings 43 by tubes 7.

A base plate 40*d* of the distributor body 40 has a planar shape at an end facing the inlet pathway 6*a*, and has an elevated section 46 gradually elevated from a central section of the base plate 40*d*, towards an end opposite to the inlet pathway 6*a*.

Referring to FIG. 1, the outlet 40*b* including the two arrays of compartments 41, each compartment 41 being internally divided to spaces 45*a*, each being divided by the respective partition plates 45. Therefore, the fluid flowing from the inlet pathway 6*a* into the liquid pan 40*a* can be rectified in the outlet 40*b* of the distributor body 40. In this case, each space 45*a* is associated with the split flow pathway of the foreign substance removal device.

The fluid flowing under the rectified state into each space 45*a* divided separated by the partition plates 45 can be securely guided into the separate flow pathways of the foreign substance removal device via tapered outlets 42, the couplings 43, and the tubes 7.

In this way, the fluid flowing from the inlet pathway 6*a* into the liquid pan 40*a* can be guided under fixed conditions to the separate flow pathways of the foreign substance removal device via the tapered outlets 42, the couplings 43, and the tubes 7, by rectifying the flow of the fluid in each space 45*a* of the outlet 40*b*.

The partition plates 45 in each compartment 41 are each orthogonal to the flow direction of the fluid in the distributor body 40, with a lower end of each partition plate 45 being positioned slightly above a lower end of the compartment 41. In this case, the partition plate 45 may be extended further downward to an internal position of the liquid pan 40*a* so that the lower end of the partition plate 45 is positioned below the lower end of the compartment 41.

In addition, while an example in which the outlet 40*b* is formed by the two arrays of compartments 41 has been described and shown, the arrangement of the compartments 41 is not limited to two arrays and may have four or more arrays in the flow direction of the fluid.

Furthermore, the outlet 40*b* may be internally divided into the appropriate number of segments according to the separate flow pathways of the foreign substance removal device by forming the outlet 40*b* from a single compartment, instead of forming the outlet using the compartments 41, and providing a lattice-shaped partition plate 45 inside the outlet 40*b* formed of the single compartment. The plates of the partition plates 45 in this case will extend in the flow direction of the fluid in the distributor body 40 and in a direction orthogonal to the flow direction of the fluid.

Next, operation of the present embodiment thus constructed will be described.

The fluid stored within a tank not shown is supplied from the inlet pathway 6*a* to the distributor 6 by a pump.

The fluid that has flown into the distributor 6 further flows from the liquid pan 40*a* thereof into the outlet 40*b* and then further flows therefrom in an equally distributed condition through the outlet pathways 42, the couplings 43, and the tubes 7, into the separate flow pathways of the foreign substance removal device.

During this inflow, the fluid that has been introduced from the inflow pathway 6*a* into the distributor 6 can be distributed uniformly and securely to the separate flow pathways of the foreign substance removal device by the distributor 6. That is to say, referring to FIG. 1, the fluid flowing from the inlet pathway 6*a* into the liquid pan 40*a* can be rectified in the outlet 40*b* of the distributor body 40, in which each space 45*a* is associated with the corresponding divided flow pathway of the foreign substance removal device, since the outlet 40*b* includes the two arrays of compartments 41 and each compartment 41 is internally divided to spaces 45*a* by the respective partition plates 45. The fluid flowing under the rectified state into each space 45*a* separated by the partition plates 45 can be securely guided into the separate flow pathways of the foreign substance removal device via the tapered outlets 42.

In this way, the fluid flowing from the inlet pathway 6*a* into the liquid pan 40*a* can be guided under the same conditions from the couplings 43 through the tubes 7 to the separate flow pathways of the foreign substance removal device by rectifying the flow of the fluid in each space 45a of the outlet 40b.

Accordingly, when coupled to a foreign substance removal device, the distributor according to the present invention can improve foreign substance removing accuracy and minimize a loss of the fluid which can be eliminated together with foreign substances.

The invention claimed is:

1. A distributor comprising:
a distributor body communicated at one end thereof with an inlet pathway of a liquid-form fluid, and closed at the other end thereof; and
a plurality of outlet pathways each provided at an upper section of the distributor body, each of the outlet pathways being formed along a flow direction of the liquid-form fluid on the inlet side in the distributor body;
wherein:
the distributor body has an upper side and a lower side;
the distributor body includes a liquid pan formed on the lower side to which the liquid-form fluid flows, and an outlet formed on the upper side, the outlet of the distributor body being divided to spaces, each of the spaces being associated with the corresponding outlet pathway;
the outlet of the distributor body is divided to spaces, each of the spaces being associated with the corresponding outlet pathway, by a lattice-shaped partition plate including a plurality of partition plates, which form a lattice shape, provided in the distributor body, each partition plate of the lattice-shaped partition plate extending downward from the corresponding outlet pathway;
the partition plates are arranged orthogonally with respect to the flow direction of the fluid on the inlet side in the distributor body; and
the distributor body allows fluid that has flowed into the distributor to flow through the outlet pathways.

2. The distributor according to claim 1, wherein the outlet above the distributor body includes a plurality of compartments each extending upward from the liquid pan, the compartments being formed independently of one another.

3. The distributor according to claim 1, wherein each outlet pathway provided above the distributor body includes a tapered outlet pathway tapering towards an upward end thereof.

4. The distributor according to claim 1, wherein the liquid pan of the distributor body includes a base plate gradually elevated in the flow direction of the liquid-form fluid.

5. The distributor according to claim 2, wherein each outlet pathway provided above the distributor body includes a tapered outlet pathway tapering towards an upward end thereof.

6. The distributor according to claim 2, wherein the liquid pan of the distributor body includes a base plate gradually elevated in the flow direction of the liquid-form fluid.

7. The distributor according to claim 3, wherein the liquid pan of the distributor body includes a base plate gradually elevated in the flow direction of the liquid-form fluid.

8. The distributor according to claim 1, wherein the partition plates of the lattice-shaped partition plate have lower ends which are arranged in the same horizontal plane.

9. A distributor comprising:
a distributor body communicated at one end thereof with an inlet pathway of a liquid-form fluid, and closed at the other end thereof; and
a plurality of outlet pathways each provided at an upper section of the distributor body, each of the outlet pathways being formed along a flow direction of the liquid-form fluid on the inlet side in the distributor body;
wherein:
the distributor body has an upper side and a lower side;
the distributor body includes a liquid pan formed on the lower side to which the liquid-form fluid flows, and an outlet formed on the upper side, the outlet of the distributor body being divided to spaces, each of the spaces being associated with the corresponding outlet pathway;
the outlet of the distributor body is divided to spaces, each of the spaces being associated with the corresponding outlet pathway, by a lattice-shaped partition plate including a plurality of partition plates, which form a lattice shape, provided in the distributor body, each partition plate of the lattice-shaped partition plate extending downward from the corresponding outlet pathway;
the partition plates are arranged orthogonally with respect to the flow direction of the fluid on the inlet side in the distributor body; and
the distributor body allows fluid that has flowed into the distributor to flow through the outlet pathways,
wherein
(A) the liquid pan has a base plate including a planar shape at one side end facing the inlet pathway, and
(B) the base plate has an elevated section gradually elevated from a central section of the base plate toward the other side end opposite to the one side end.

10. The distributor according to claim 9, wherein the outlet above the distributor body includes a plurality of compartments each extending upward from the liquid pan, the compartments being formed independently of one another.

11. The distributor according to claim 9, wherein each outlet pathway provided above the distributor body includes a tapered outlet pathway tapering towards an upward end thereof.

12. The distributor according to claim 10, wherein each outlet pathway provided above the distributor body includes a tapered outlet pathway tapering towards an upward end thereof.

13. The distributor according to claim 9, wherein the partition plates of the lattice-shaped partition plate have lower ends which are arranged in the same horizontal plane.

14. An apparatus comprising a distributor according to claim 1 and a foreign substance removal device, wherein each of said spaces is associated with a separate flow pathway of the foreign substance removal device.

15. An apparatus comprising a distributor according to claim 9 and a foreign substance removal device, wherein each of the spaces is associated with a separate flow pathway of the foreign substance removal device.

* * * * *